(12) United States Patent
Lee et al.

(10) Patent No.: US 12,494,802 B2
(45) Date of Patent: Dec. 9, 2025

(54) METHOD AND APPARATUS FOR EXTRACTING NOISE DEFECT, AND STORAGE MEDIUM STORING INSTRUCTIONS TO PERFORM METHOD FOR EXTRACTING NOISE DEFECT

(71) Applicant: Research & Business Foundation SUNGKYUNKWAN UNIVERSITY, Suwon-si (KR)

(72) Inventors: Jong Seok Lee, Suwon-si (KR); Tae Heung Kim, Suwon-si (KR); Minseok Han, Suwon-si (KR)

(73) Assignee: Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 71 days.

(21) Appl. No.: 18/396,178

(22) Filed: Dec. 26, 2023

(65) Prior Publication Data
US 2024/0223217 A1 Jul. 4, 2024

(30) Foreign Application Priority Data
Dec. 23, 2022 (KR) .......................... 10-2022-0183537

(51) Int. Cl.
*H03M 13/00* (2006.01)
(52) U.S. Cl.
CPC ................................ *H03M 13/612* (2013.01)
(58) Field of Classification Search
CPC .................................................. H03M 13/612

USPC .......................................................... 714/817
See application file for complete search history.

(56) References Cited

U.S. PATENT DOCUMENTS

| | | | |
|---|---|---|---|
| 6,455,832 B1* | 9/2002 | Kuwabara | H04N 25/68 257/E27.141 |
| 2003/0002723 A1* | 1/2003 | Li | G06T 7/0012 382/128 |
| 2006/0221252 A1* | 10/2006 | Zhou | H04N 17/00 348/700 |
| 2012/0294507 A1* | 11/2012 | Sakai | G01N 21/9501 382/149 |
| 2013/0202188 A1* | 8/2013 | Urano | G06T 7/001 382/145 |
| 2018/0103247 A1* | 4/2018 | Kolchin | G06T 7/0004 |
| 2019/0206047 A1* | 7/2019 | Honda | G01N 21/8851 |
| 2021/0208578 A1* | 7/2021 | Amano | H04L 63/1425 |
| 2021/0264026 A1* | 8/2021 | Amano | G06F 21/554 |
| 2022/0124517 A1* | 4/2022 | Guo | H04L 41/40 |

* cited by examiner

*Primary Examiner* — Albert Decady
*Assistant Examiner* — Osman M Alshack

(57) ABSTRACT

There is provided a method of extracting a noise defect from defect data. The method comprises obtaining the defect data including data on a plurality of defects, determining one of a plurality of abnormal value calculators for calculating abnormal values using each of a variety of predetermined calculation methods and calculating an abnormal value for each of the plurality of defects using one of the plurality of abnormal value calculator, generating a frequency histogram for each of the plurality of defects using the abnormal value, calculating similarity between the plurality of defects using the frequency histogram for each of the plurality of defects, and extracting the noise defect from the plurality of defects based on the similarity

20 Claims, 12 Drawing Sheets

FIRST DEFECT

SECOND DEFECT

THIRD DEFECT

FOURTH DEFECT

Synthetic dataset 1 (D1)

Synthetic dataset 2 (D2)

Synthetic dataset 3 (D3)

Synthetic dataset 4 (D4)

Synthetic dataset 5 (D5)

Synthetic dataset 6 (D6)

FIG. 6

| Method | D1 | D2 | D3 | D4 | D5 | D6 | Avg. Rank |
|---|---|---|---|---|---|---|---|
| AggkNN | 0.9932 | 0.9782 | 0.8782 | 0.9755 | 0.9771 | 0.7187 | 3.50 |
| CCPOD | 0.9051 | 0.5758 | 0.6824 | 0.6597 | 0.7981 | 0.6129 | 24.50 |
| COF | 0.9454 | 0.8686 | 0.8180 | 0.9264 | 0.9658 | 0.6196 | 14.17 |
| DSNOF | 0.9576 | 0.8159 | 0.8008 | 0.9079 | 0.9154 | 0.5506 | 18.25 |
| FNOF | 0.9576 | 0.8102 | 0.7886 | 0.8827 | 0.9210 | 0.6647 | 17.42 |
| INFLO | 0.9681 | 0.7874 | 0.7902 | 0.8806 | 0.9230 | 0.6727 | 16.83 |
| INS | 0.9923 | 0.9830 | 0.9511 | 0.9941 | 0.9981 | 0.9249 | 1.67 |
| kNN | 0.9464 | 0.8815 | 0.8208 | 0.8759 | 0.9266 | 0.6564 | 15.50 |
| LDBOD | 0.8927 | 0.9245 | 0.8550 | 0.9426 | 0.9632 | 0.7149 | 7.33 |
| LDF | 0.9719 | 0.8244 | 0.8250 | 0.8685 | 0.9240 | 0.6882 | 14.83 |
| LDOF | 0.9889 | 0.7253 | 0.8540 | 0.9543 | 0.9486 | 0.7562 | 9.33 |
| LIC | 0.9747 | 0.9355 | 0.8483 | 0.9310 | 0.9544 | 0.6814 | 9.50 |
| LOF | 0.9723 | 0.8326 | 0.8277 | 0.8783 | 0.9293 | 0.6892 | 13.17 |
| LoOP | 0.9909 | 0.8124 | 0.8108 | 0.9489 | 0.9528 | 0.6273 | 12.50 |
| NDoT | 0.9911 | 0.7810 | 0.7956 | 09333 | 0.9396 | 0.6638 | 13.50 |
| OF | 0.9872 | 0.9106 | 0.8262 | 0.8745 | 0.9663 | 0.6198 | 12.83 |
| OOF | 0.9030 | 0.7609 | 0.6463 | 0.7058 | 0.7833 | 0.4287 | 24.83 |
| POD | 0.8547 | 0.9617 | 0.8212 | 0.7281 | 0.9042 | 0.6557 | 17.50 |
| RBDA | 0.9854 | 0.8716 | 0.8361 | 0.9633 | 0.9600 | 0.6981 | 8.17 |
| SOD | 0.6432 | 0.6554 | 0.6365 | 0.7209 | 0.5800 | 0.5872 | 25.83 |
| VOV | 0.9231 | 0.8757 | 0.7842 | 0.8327 | 0.8790 | 0.5894 | 20.17 |
| GMMOF | 0.9950 | 0.8996 | 0.9374 | 0.9722 | 0.9334 | 0.6819 | 7.17 |
| NOF | 0.9636 | 0.7100 | 0.7506 | 0.9640 | 0.9431 | 0.8125 | 13.08 |
| RDOS | 0.9394 | 0.8389 | 1.0000 | 0.8055 | 0.9051 | 0.9375 | 13.17 |
| VOS | 0.8060 | 0.9356 | 0.7506 | 0.8631 | 0.9336 | 0.6979 | 15.92 |
| COPOD | 0.6725 | 0.5167 | 0.7091 | 0.6109 | 0.8387 | 0.7292 | 22.33 |
| BAND | 0.9800 | 0.9679 | 0.9000 | 0.9549 | 0.9826 | 0.7458 | 5.00 |

WBM dataset (Korea) 1

WBM dataset (Korea) 2

WBM dataset (Korea) 3

WBM dataset (Korea) 4

WBM dataset (MIR-WM811K) 1

WBM dataset (MIR-WM811K) 2

WBM dataset (MIR-WM811K) 3

WBM dataset (MIR-WM811K) 4

WBM dataset (MIR-WM811K) 5

WBM dataset (MIR-WM811K) 6

WBM dataset (MIR-WM811K) 7

WBM dataset (MIR-WM811K) 8

METHOD AND APPARATUS FOR EXTRACTING NOISE DEFECT, AND STORAGE MEDIUM STORING INSTRUCTIONS TO PERFORM METHOD FOR EXTRACTING NOISE DEFECT

CROSS-REFERENCE TO RELATED APPLICATIONS

This application claims the benefit under 35 USC § 119(a) of Korean Patent Application No. 10-2022-0183537, filed on Dec. 23, 2022, in the Korean Intellectual Property Office, the entire disclosure of which is incorporated herein by reference for all purposes.

TECHNICAL FIELD

The present disclosure relates to a method and an apparatus for extracting a noise defect from defect data without setting a parameter.

This work was supported by Institute of Information & communications Technology Planning & Evaluation (IITP) grant funded by Korea government (MSIT) (No. 2021-0-00292-002, Development of digital twin-based manufacturing RPA training, generation, evaluation, and application S/W platform).

BACKGROUND

The pattern of defects on a semiconductor wafer provides useful information about the cause of abnormalities in process equipment. Since early detection of process problems is directly related to wafer yield issues, methods for specifying wafer defect patterns are recognized as important factors in terms of facility condition management and yield management in a semiconductor process.

In order to accurately specify the defect patterns, it is necessary to classify the defect on semiconductor wafers into a normal defect and a noise defect and remove the noise defect. Here, the normal defect refers to a texture that forms a specific pattern with other defects, and the noise defect refers to small defects that are sparsely distributed without the specific pattern on the wafer.

Conventionally, the noise defect is detected and removed based on distance or density in a wafer space. In order to increase the accuracy of this method, it is necessary to precisely set a distance-based parameter or density-based parameter. However, since wafer defects have very complex and irregular patterns, determining appropriate parameters for each wafer is a very difficult problem.

SUMMARY

An object of the present disclosure is to provide a method for extracting a noise defect from defect data without setting a parameter.

The aspects of the present disclosure are not limited to the foregoing, and other aspects not mentioned herein will be clearly understood by those skilled in the art from the following description.

In accordance with an aspect of the present disclosure, there is provided a method for extracting a noise defect from defect data, the method comprises: obtaining the defect data including data on a plurality of defects: determining one of a plurality of abnormal value calculators for calculating abnormal values using each of a variety of predetermined calculation methods and calculating an abnormal value for each of the plurality of defects using one of the plurality of abnormal value calculator; generating a frequency histogram for each of the plurality of defects using the abnormal value: calculating similarity between the plurality of defects using the frequency histogram for each of the plurality of defects: and extracting the noise defect from the plurality of defects based on the similarity.

The determining the one of the plurality of abnormal value calculators may include randomly selecting one of the plurality of abnormal value calculators.

The extracting of the abnormal value for each of the plurality of defects may include setting a parameter of the selected abnormal value calculator to a random value.

The plurality of abnormal value calculators may include at least two of Aggregated k Nearest Neighbors (AggkNN), Centrality and Center-Proximity-based Outlier Detection (CCPOD), Connectivity-based Outlier Factor (COF), Density Similarity Neighbor-based Outlier Factor (DSNOF), Forward Neighbor Outlier Factor (FNOF), INFLuenced Outlierness (INFLO), INStability factor (INS), k Nearest Neighbors (kNN), Local Distribution-Based Outlier Detector (LDBOD), Local Density Factor (LDF), Local Distance-based Outlier Factor (LDOF), Local Isolation Coefficient (LIC), Local Outlier Factor (LOF), Local Outlier Probability (LoOP), Nearest-neighbor Distance-based Outlier detection Technique (NDoT), Observability Factor (OF), Ordered distance difference Outlier Factor (OOF), Prototype-based Outlier Detection (POD), Rank-Based Detection Algorithm (RBDA), Synchronization-based Outlier Detection (SOD), Variance Of Volume (VOV), Gaussian Mixture Model Outlier Factor (GMMOF), Natural Outlier Factor (NOF), Relative Density-based Outlier Score (RDOS), Virtual Outlier Score (VOS), and COPula-based Outlier Detection (COPOD).

The extracting of the abnormal value for each of the plurality of defects may include selecting one of the plurality of abnormal value calculators randomly, calculating the abnormal value for each of the plurality of defects using the selected abnormal value calculator, and repeating the selecting one of the plurality of abnormal value calculators randomly and the calculating the abnormal value for each of the plurality of defects using the selected abnormal value calculator by a preset number of times. Also, the generating of the frequency histogram may include generating the frequency histogram for each of the plurality of defects using the abnormal values for each of the plurality of defects calculated by the repeating the first step and the second step by the preset number of times.

The extracting of the abnormal value for each of the plurality of defects may include normalizing the abnormal value of each of the plurality of defects. Also, the generating of the frequency histogram for each of the plurality of defects may include generating the frequency histogram for each of the plurality of defects using the normalized abnormal value.

The calculating of the similarity between the plurality of defects may include selecting two defects from the plurality of defects, and calculating a difference between the frequency histograms of the selected two defects.

The calculating of the difference between the frequency histograms of the two defects may include calculating a difference in frequency for each class of the two defects using the frequency histograms of the two defects, and calculating a frequency histogram difference between the two defects by adding, for each class, an absolute value of the difference in frequency for each class.

The selecting of two defects from the plurality of defects and the calculating of the difference between the frequency histograms of the two defects may repeatedly be performed as many times as the number of cases in which two different defects are selected from the plurality of defects.

The method may include generating a similarity matrix for the defect data using the similarity between the plurality of defects. Also, the extracting of the noise defect may include extracting the noise defect from the plurality of defects based on the similarity matrix.

The extracting of the noise defect may include clustering the plurality of defects into a first cluster and a second cluster using spectral clustering, and extracting defects included in a smaller cluster of the first cluster and the second cluster as the noise defect.

In accordance with another aspect of the present disclosure, there is provided an apparatus for extracting a noise defect, the apparatus comprises: a memory configured to store one or more instructions and a plurality of abnormal value calculators for calculating abnormal values using each of a variety of predetermined calculation methods: and a processor configured to execute the one or more instructions stored in the memory, wherein the instructions, when executed by the processor, cause the processor to: obtain defect data including data on a plurality of defects, determine one of a plurality of abnormal value calculators and calculate an abnormal value for each of the plurality of defects using one of the plurality of abnormal value calculator, generate a frequency histogram for each of the plurality of defects using the abnormal value, calculate similarity between the plurality of defects using the frequency histogram for each of the plurality of defects, and extract the noise defect from the plurality of defects based on the similarity.

The processor may be configured to randomly select one of the plurality of abnormal value calculators.

The processor is configured to set a parameter of the selected abnormal value calculator to a random value.

The processor is configured to: calculate the abnormal value for each of the plurality of defects by repeating an operation of randomly selecting one of the plurality of abnormal value calculators and an operation of calculating the abnormal value for each of the plurality of defects using the selected abnormal value calculator, and generate the frequency histogram for each of the plurality of defects using the abnormal values for each of the plurality of calculated defects.

The processor is configured to normalize the abnormal value of each of the plurality of defects and generate the frequency histogram for each of the plurality of defects using the normalized abnormal value.

The processor is configured to select two defects from the plurality of defects, and calculate a difference between the frequency histograms of the two defects.

The processor is configured to calculate a difference in frequency for each class of the two defects using the frequency histograms of the two defects, and calculate a frequency histogram difference between the two defects by adding, for each class, an absolute value of the difference in frequency for each class.

The processor is configured to generate a similarity matrix for the defect data using the similarity between the plurality of defects, and extract the noise defect from the plurality of defects based on the similarity matrix.

In accordance with another aspect of the present disclosure, there is provided a non-transitory computer-readable recording medium storing a computer program, which comprises instructions for a processor to perform a method for extracting a noise defect from defect data, the terminal control method comprise: obtaining the defect data including data on a plurality of defects: determining one of a plurality of abnormal value calculators for calculating abnormal values using each of a variety of predetermined calculation methods and calculating an abnormal value for each of the plurality of defects using one of the plurality of abnormal value calculator: generating a frequency histogram for each of the plurality of defects using the abnormal value: calculating similarity between the plurality of defects using the frequency histogram for each of the plurality of defects: and extracting the noise defect from the plurality of defects based on the similarity.

According to one embodiment of the present disclosure, by randomly selecting one of the plurality of abnormal value calculators and setting the parameter of the selected abnormal value calculator to the random value, the noise defect can be extracted without elaborately setting the parameter.

According to one embodiment of the present disclosure, by extracting the noise defect without elaborately setting the parameter, even a non-expert of data mining can easily use the method of the present disclosure at a semiconductor manufacturing site.

According to one embodiment of the present disclosure, the noise defect removal device can be used not only for the purpose of removing the noise defect in a semiconductor wafer, but also for the purpose of removing an abnormal value present in a dataset when analyzing general numerical data.

BRIEF DESCRIPTION OF THE DRAWINGS

FIG. 6 illustrates performance difference between a noise defect extraction method according to one embodiment and the existing method.

DETAILED DESCRIPTION

Figure 1:
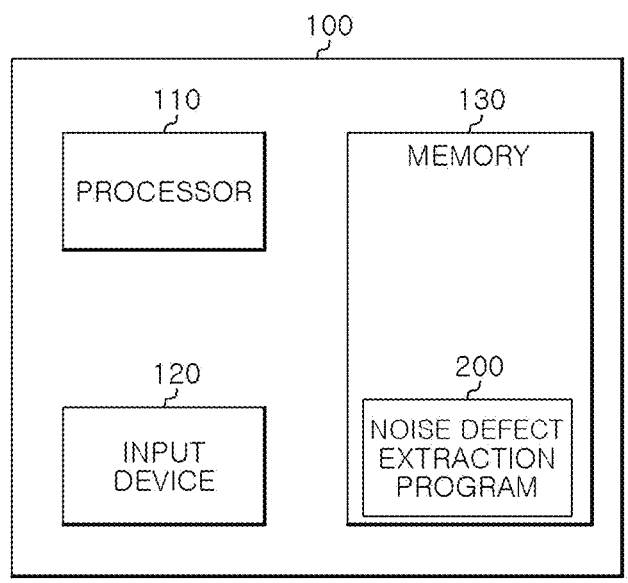
FIG. 1 is a block diagram illustrating a noise defect extraction device according to one embodiment.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

FIG. 1 is a block diagram illustrating a noise defect extraction device according to one embodiment.

Referring to FIG. 1, a noise defect extraction device 100 may include a processor 110, an input device 120, and a memory 130.

The processor 110 can generally control the operation of the noise defect extraction device 100.

The processor 110 may receive defect data as input using the input device 120.

In the present specification, defect data may refer to data about defects formed in a wafer. Depending on an embodiment, when a plurality of defects are formed in a wafer, defect data may include data for each of the plurality of defects formed. Additionally, depending on an embodiment, defect data may indicate the location of the defect.

Additionally, in the present specification, the noise defect extraction device 100 has been described as receiving defect data by using the input device 120, but is not limited thereto. That is, depending on the embodiment, the noise defect extraction device 100 may include a transceiver (not illustrated) instead of or in addition to the input unit 120 and receive defect data by using the transceiver (not illustrated).

Alternatively, depending on an embodiment, the defect data may be generated within the noise defect extraction device 100. Therefore, in the present specification, the transceiver 120 and an input/output device (not illustrated) may be collectively referred to as an acquisition unit.

The memory 130 may store a noise defect extraction program 200 and information necessary for executing the noise defect extraction program 200.

In the present specification, the noise defect extraction program 200 may refer to software that includes commands programmed to extract the noise defect from the input defect data when the defect data is input.

The processor 110 may load the noise defect extraction program 200 and the information required to execute the noise defect extraction program 200 from the memory 130 in order to execute the noise defect extraction program 200.

Additionally, the processor 110 may execute the noise defect extraction program 200 to extract the noise defect from defect data.

The defect noise extraction program 200 will be described in more detail in FIG. 2.

Figure 2:
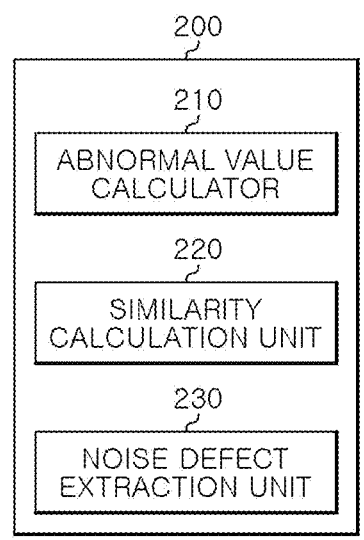
FIG. 2 is a block diagram conceptually illustrating a function of a noise defect extraction program according to one embodiment.
Figure 3A:
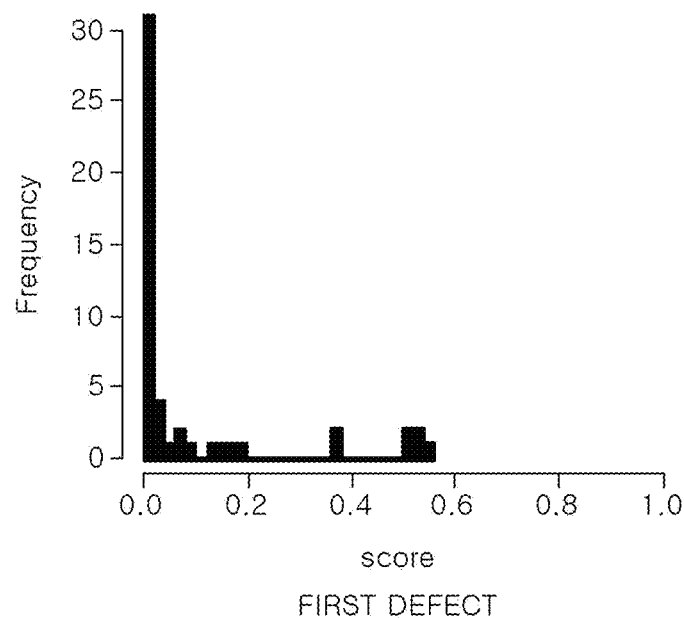
FIGS. 3A to 3D illustrate examples of a frequency histogram of a plurality of defects generated by an abnormal value calculation unit according to one embodiment.
Figure 3B:
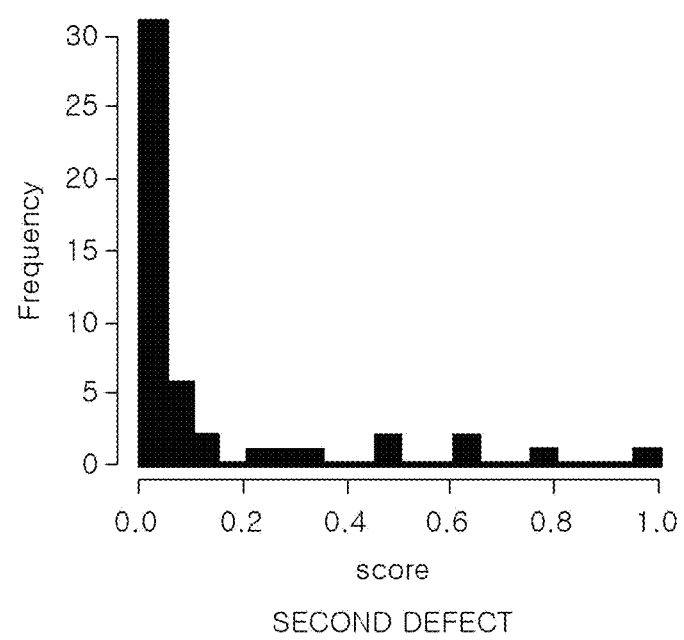
Figure 3C:
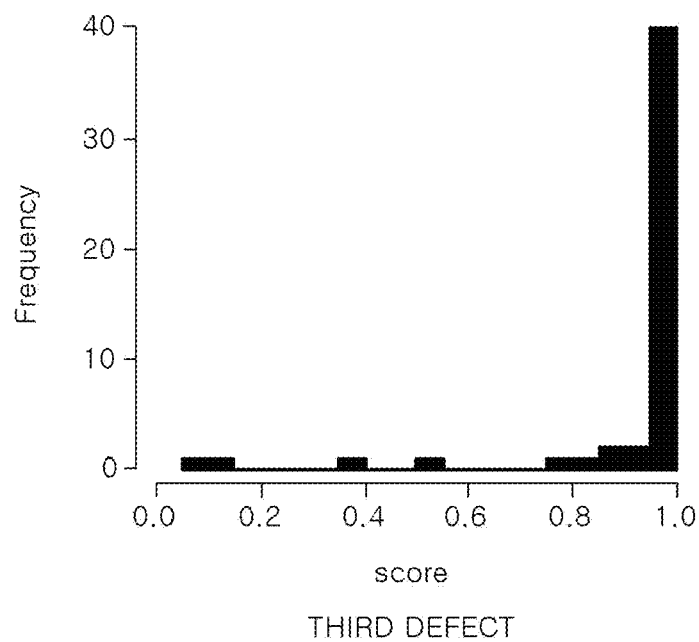
Figure 3D:
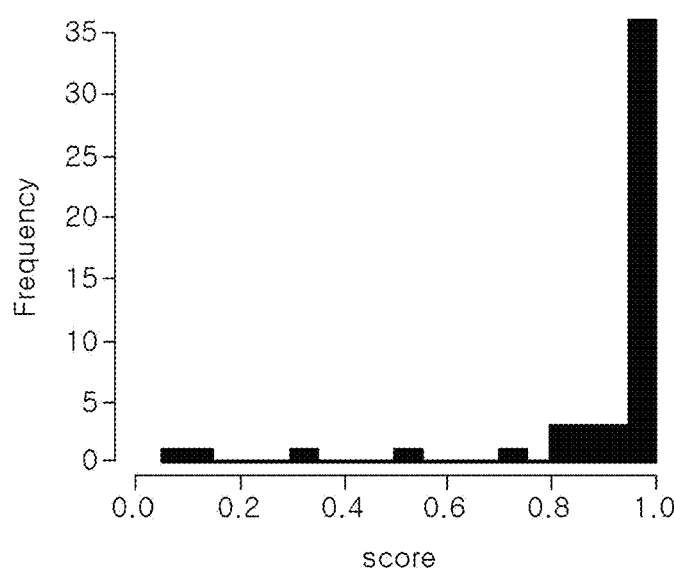

FIG. 2 is a block diagram conceptually illustrating the function of the noise defect extraction program according to one embodiment.

Referring to FIG. 2, the noise defect extraction program 200 may include an abnormal value calculation unit 210, a similarity calculation unit 220, and a noise defect extraction unit 230.

The abnormal value calculation unit 210, the similarity calculation unit 220, and the noise defect extraction unit 230 illustrated in FIG. 2 are obtained by conceptually dividing the function of the noise defect extraction program 200 to easily explain the function of the noise defect extraction program 200, and are not limited to this. Depending on an embodiment, the functions of the abnormal value calculation unit 210, the similarity calculation unit 220, and the noise defect extraction unit 230 can be merged/separated and implemented as a series of commands included in one program.

The abnormal value calculation unit 210 may calculate an abnormal value of defect data using any one of a plurality of abnormal value calculators.

More specifically, the abnormal value calculation unit 210 may randomly select one of the plurality of abnormal value calculators and calculate the abnormal value of the defect data using the selected abnormal value calculator.

Here, the abnormal value may indicate the degree of the defect.

Additionally, the plurality of abnormal value calculators are different algorithms, software, or devices that calculate the abnormal value of the defect, and may correspond to the existing noise defect calculation methods (devices). For example, the plurality of abnormal value calculators may include at least two of Aggregated k Nearest Neighbors (AggkNN), Centrality and Center-Proximity-based Outlier Detection (CCPOD), Connectivity-based Outlier Factor (COF), Density Similarity Neighbor-based Outlier Factor (DSNOF), Forward Neighbor Outlier Factor (FNOF), INFLuenced Outlierness (INFLO), INStability factor (INS), k Nearest Neighbors (kNN), Local Distribution-Based Outlier Detector (LDBOD), Local Density Factor (LDF), Local Distance-based Outlier Factor (LDOF), Local Isolation Coefficient (LIC), Local Outlier Factor (LOF), Local Outlier Probability (LoOP), Nearest-neighbor Distance-based Outlier detection Technique (NDoT), Observability Factor (OF), Ordered distance difference Outlier Factor (OOF), Prototype-based Outlier Detection (POD), Rank-Based Detection Algorithm (RBDA), Synchronization-based Outlier Detection (SOD), Variance Of Volume (VOV), Gaussian Mixture Model Outlier Factor (GMMOF), Natural Outlier Factor (NOF), Relative Density-based Outlier Score (RDOS), Virtual Outlier Score (VOS), and COPula-based Outlier Detection (COPOD).

Depending on an embodiment, when the defect data includes data for the plurality of defects, the abnormal value calculation unit 210 may calculate an abnormal value for each of the plurality of defects. Meanwhile, when the defect data includes data on the plurality of defects, the abnormal value calculation unit 210 may calculate only the abnormal value for at least one selected from the plurality of defects using a preset method.

When calculating the abnormal value of defect data using the selected abnormal value calculator, the parameters of the selected abnormal value calculator should be set, and the abnormal value calculator 210 may set the parameter of the abnormal value calculator to a random value.

Here, the parameters of the abnormal value calculator may be as illustrated in Table 1 below.

TABLE 1

| Method | Parameter values |
|---|---|
| POD | $n_p = 0.1\,n$, $k_1 = 0.1\,n_p$, $k_2 \in \{1, 2, \ldots, k_1\}$, $\delta \in [2, 4]$ |
| LDF, RDOS | $h \in \{0.5, 0.6, \ldots, 2.9, 3.0\}$ |
| LDBOD | $w_1 + w_2 + w_3 = 1$, $\sigma \in \{50, 60, \ldots, 140, 150\}$ |
| LoOP | $\lambda \in \{0.5, 0.6, \ldots, 3.9, 4.0\}$ |
| GMMOF | $\sigma \in \{0.1, 0.2, \ldots, 4.9, 5.0\}$ |
| NDoT | $\delta \in [1, 3]$ |
| CCPOD | $\text{max.itr} \in \{5, 6, \ldots, 9, 10\}$ |
| OF | $\text{rep} = 1000$ |

That is, when the abnormal value calculator is POD, the parameter may include at least one of $n_p$, $k_1$, $k_2$, and $\delta$, and when the abnormal value calculator is LoOP, the parameter may include $\lambda$.

As the abnormal value calculation unit 210 sets the parameters of the abnormal value calculator to the random values, the noise defect extraction device 100 according to one embodiment can extract the noise defects without precisely setting the parameters, unlike the existing method.

The abnormal value calculation unit 210 may normalize the abnormal value of the calculated defect data. This is because, depending on the selected abnormal value calculator, the range (minimum value, minimum value) of the calculated abnormal value may be different.

Depending on an embodiment, the abnormal value calculation unit 210 may normalize the abnormal value of the calculated defect data to a value in the range of [0, 1].

The abnormal value calculation unit 210 may randomly select one of the plurality of abnormal value calculators, calculate the abnormal value of the defect data using the selected abnormal value calculator, and repeat the process of normalizing the calculated abnormal value by a preset number of times.

By repeating the above process, the abnormal value calculation unit 210 can obtain at least one normalized abnormal value for each of the plurality of defects included in the defect data.

The abnormal value calculation unit 210 may generate a frequency histogram for each of the plurality of defects using at least one normalized abnormal value obtained.

The similarity calculation unit 220 may calculate similarity between the plurality of defects using the frequency histogram for each of the plurality of defects.

More specifically, the similarity calculation unit 220 may calculate the similarity between the frequency histograms of the two selected defects by selecting two defects from a plurality of defects and calculating the difference between the frequency histograms of the two selected defects.

Meanwhile, depending on an embodiment, the frequency histogram of the plurality of defects may be divided into a plurality of classes and expressed according to Equation 1 below.

$$b = 1 + \log_2 r \qquad \text{[Equation 1]}$$

Here, b represents the number of classes, and r may represent the number of repetitions performed by the abnormal value calculation unit 210.

For example, when the abnormal value calculation unit 210 normalizes the abnormal value of defect data to [0, 1] and the abnormal value calculation unit 210 performs repetitions 16 times, the class of the frequency histogram can be composed of values (0.0, 0.2, 0.4, 0.6, 0.8, 1.0) obtained by dividing [0, 1] into five equal parts.

In this case, the similarity calculation unit 220 may compare the frequencies of the two defects by class, calculate the class-specific difference in the frequencies of the two defects, and add absolute values of the class-specific differences to calculate the difference in the frequency histogram of the two defects.

The similarity calculation unit 220 repeats the above process as many times as the number of cases in which two different defects are selected from the plurality of defects (that is, by repeating the above process for all possible defect pairs of the plurality of defects), and thus, the similarity between the plurality of defects can be calculated. For example, when the defect data includes 12 defects, the similarity calculation unit 220 may repeat the above process 132 times (=12C2, that is, the number of cases of selecting two different defects among 12 defects), and thus, it is possible to calculate the similarity between 12 defects.

Thereafter, the similarity calculation unit 220 may generate a similarity matrix (that is, a similarity matrix for the plurality of defects) (affinity matrix) for the defect data using the similarity between the plurality of defects.

More specifically, the similarity calculation unit 220 may generate the similarity matrix for defect data based on Equation 2 below.

$$AF_{i,j} = \frac{\exp[-MDPA(H_i H_j)^2]}{2}, AF_{i,i} = 0 \qquad \text{[Equation 2]}$$

Here, AF represents the similarity matrix, i and j represent the rows and columns of the matrix, respectively, Hi and Hj represent the frequency histograms of two defects selected from the plurality of defects, and MDPA represents the difference between the frequency histograms of the two defects.

According to Equation 2, each element in the similarity matrix has the value of [0, 1/2], and non-negativity, reflexivity, and commutability which are the conditions for becoming the similarity condition may be satisfied.

The noise defect extraction unit 230 may extract the noise defect from the plurality of defects based on the similarity matrix.

Depending on an embodiment, the noise defect extraction unit 230 may apply spectral clustering to the similarity matrix to cluster the plurality of defects into at least two clusters, classify at least one cluster with a larger size (larger number of defects included) of at least two clusters as the normal defect, classify at least one cluster with a smaller size (smaller number of defects included) of at least two clusters as the noise defect, and thus, extract the noise defect from the plurality of defects.

For example, when the noise defect extraction unit 230 clusters the plurality of defects into the first cluster and the second cluster using the spectral clustering, the first cluster with a larger size may be classified as the normal defect and the first cluster with a smaller size may be classified as the normal defect.

FIGS. 3A to 3D illustrate examples of the frequency histogram of the plurality of defects generated by the abnormal value calculation unit according to one embodiment.

Referring to FIGS. 2 and 3, the abnormal value calculation unit 210 may generate the frequency histograms for each of a first defect, a second defect, a third defect, and a fourth defect.

As can be seen in FIGS. 3A, 3B, 3C, and 3D, the frequency histogram of the first defect and the frequency histogram of the second defect have similar shapes, and the frequency histogram of the third defect and the frequency histogram of the fourth defect have similar shapes.

Therefore, when the similarity calculation unit 220 calculates the difference between the frequency histograms of the two defects, the difference between the first defect and the second defect and the difference between the third defect and the fourth defect will be calculated as small, but the difference between the first defect and the third defect (or the fourth defect) and the difference between the second defect and the fourth defect (or the third defect) will be calculated as large.

Accordingly, the noise defect extraction unit 230 may cluster the first defect and the second defect into one cluster, and the third defect and the fourth defect into another cluster.

FIGS. 4A to 4C and FIGS. 5A to 5C illustrate examples of removing noise information included in artificial data using the noise defect device according to one embodiment.

Figure 4A:
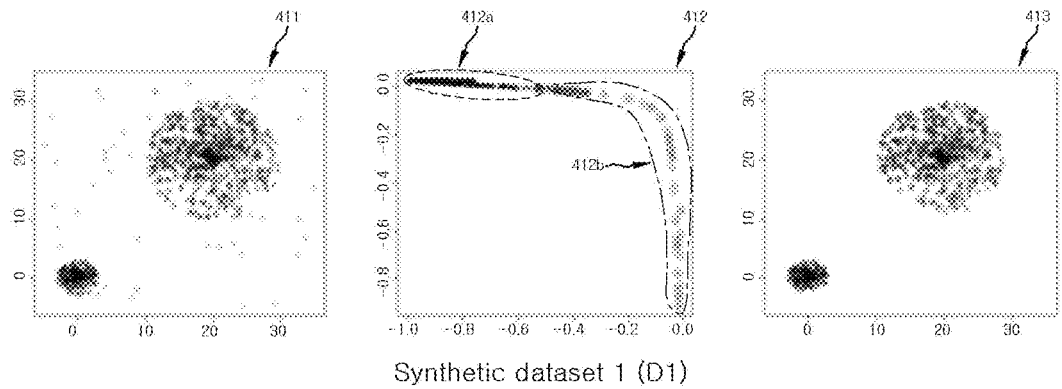
FIGS. 4A to 4C and FIGS. 5A to 5C illustrate examples of removing noise information included in artificial data using a noise defect device according to one embodiment.

First, referring to FIG. 4A, a first image 411 of FIG. 4A is a data distribution map illustrating a data distribution before the abnormal value is removed from a first synthetic dataset D1, a second image 412 is a graph illustrating a singular vector decomposed based on two singular values in the first synthetic dataset D1, and a third image 413 is a data distribution map illustrating the data distribution after the abnormal value is removed from the first synthetic dataset D1.

Referring to the first image 411 of FIG. 4A, the data of the first synthetic dataset D1 may be displayed as the data distribution map representing the data distribution, as exemplified in the first image 411.

The defect noise extraction program 200 may apply a spectral clustering to the first synthetic dataset D1 and decompose the first synthetic dataset based on two singular values to display the singular vector. The singular vectors decomposed by spectral clustering may be distributed in a first area 412a and a second area 412b. Here, the singular vector of the second area 412b may be a singular vector generated by noise. The defect noise extraction program 200 may remove data corresponding to the singular vector of the second area 412b. Accordingly, as illustrated in the third image 413, it can be confirmed that data corresponding to noise in the first synthetic dataset D1 has been removed.

Figure 4B:
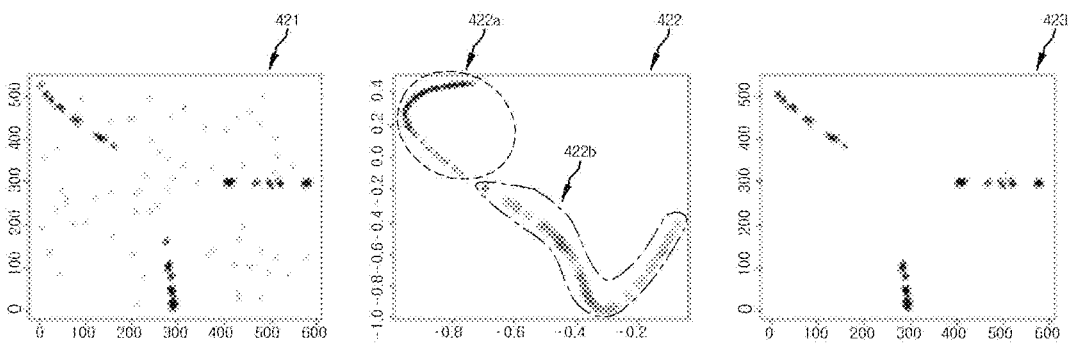

Similarly, referring to FIG. 4B, a first image 421 of FIG. 4B represents the data distribution of a second synthetic dataset D2, a second image 422 represents a singular vector in which the second synthetic dataset D2 is decomposed by the spectral clustering, and a third image 423 represents the data distribution after the abnormal values have been removed from the second synthetic dataset D2.

Figure 4C:
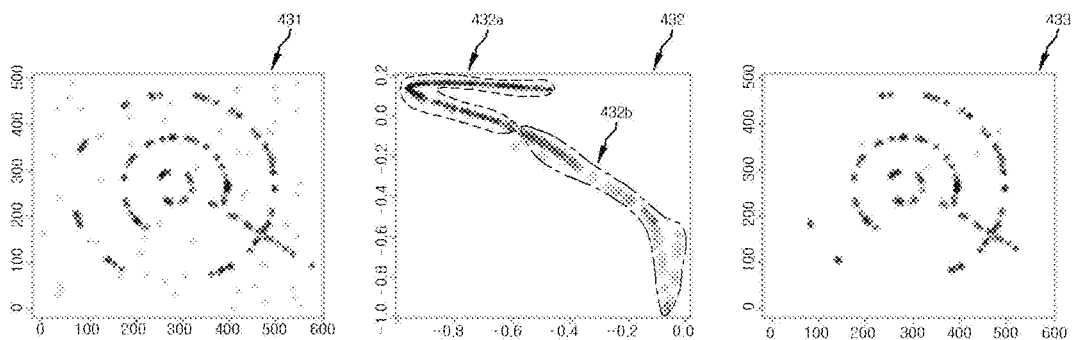

Additionally, referring to 4C, a first image 431 of FIG. 4C represents the data distribution of a third synthetic dataset D3, a second image 423 represents a singular vector in which the third synthetic dataset D3 is decomposed by the spectral clustering, and a third image 433 represents the data distribution after the abnormal values have been removed from the third synthetic dataset D3.

Figure 5A:
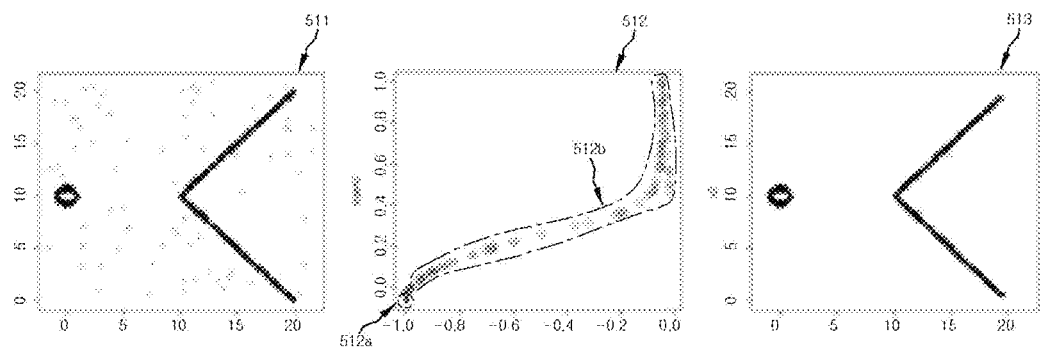
Figure 5B:
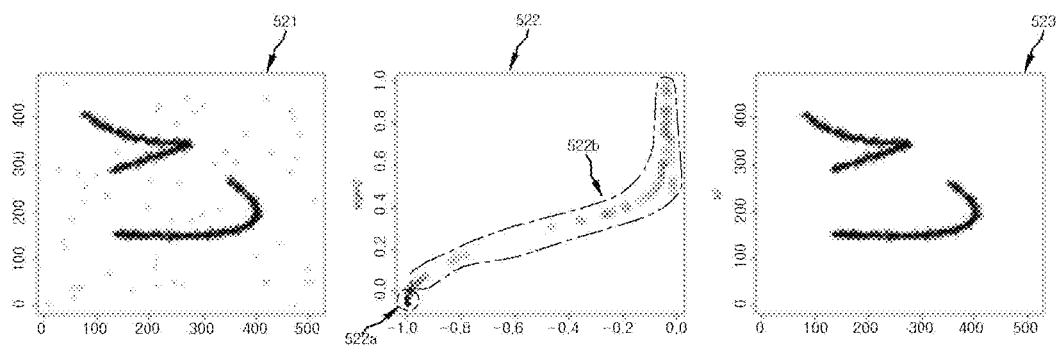
Figure 5C:
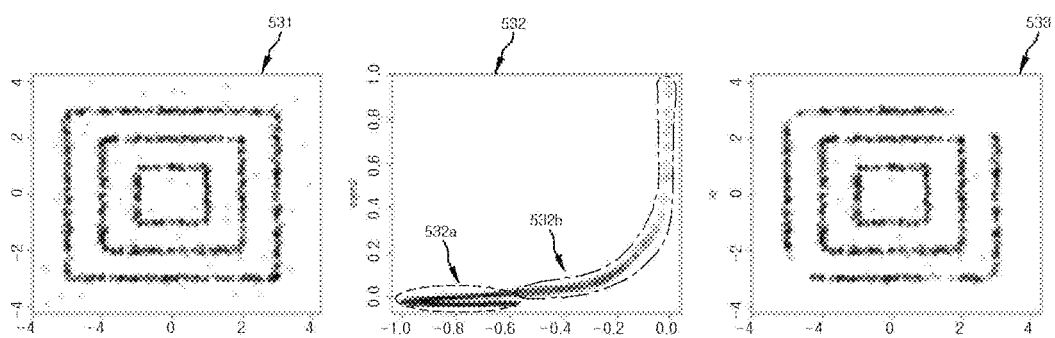

Likewise, FIGS. 5A to 5C illustrate graphs illustrating data distribution maps and singular vectors for fourth, fifth, and sixth synthetic datasets D4, D5, and D6, respectively, and data distributions after the abnormal values are removed from the fourth, fifth, and sixth synthetic datasets D4, D5, and D6. As described above with reference to FIGS. 4A to 4C and 5A to 5C, the noise defect extraction program 200 may detect data corresponding to the noise from the synthetic datasets D1, D2, D3, D4, D5, and D6 to remove the data.

FIG. 6 illustrates performance difference between the noise defect extraction method according to one embodiment and existing methods.

Referring to FIGS. 4A to 4C, 5A to 5C, and 6, the results obtained by removing the noise information from the artificial data of the synthetic datasets D1, D2, D3, D4, D5, and D6 using the existing method and the results obtained by removing the noise information from the artificial data of synthetic datasets D1, D2, D3, D4, D5, and D6 using the noise defect extraction method according to one embodiment can be confirmed.

In FIG. 6, an Area under the ROC curve (AUC) value was used as a performance evaluation scale.

According to FIG. 6, compared to the existing methods (AggkNN, CCPOD, . . . , COPOD) that require accurate parameter settings, when using the noise defect extraction method (ex, Bagging Noise Detectors (BAND)) according to one embodiment of extracting the noise defect without setting the parameter, it can be confirmed that performance above average can be achieved.

FIGS. 7A to 7D and FIGS. 8A to 8H illustrate an experimental example of removing the noise defects from actual semiconductor wafer map data using a noise defect device according to one embodiment. FIGS. 7A to 7D illustrate the results of experiments using WBM datasets, and FIGS. 8A to 8H illustrate the results of experiments using WM-811k datasets.

Figure 7A:
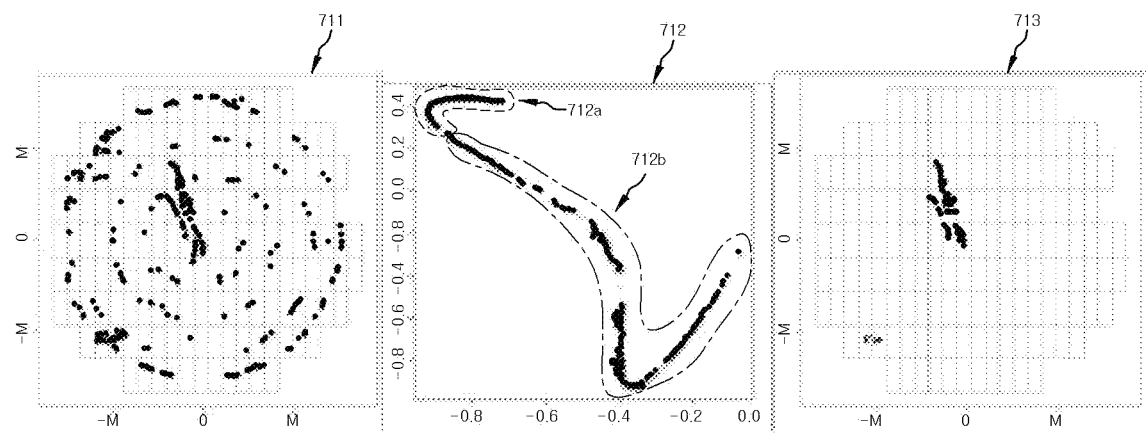
FIGS. 7A to 7D illustrate experimental examples of removing the noise defect from data of WBM datasets using the noise defect device according to one embodiment.

Referring to FIG. 7A, a first image 711 represents semiconductor wafer map data for a first WBM dataset before removing the noise defects, and a second image 712 represents the singular vector by applying the spectral clustering to the first WBM data set of the first image 711 and decomposing the first WBM data based on two singular values. In the second image 712, the singular vectors decomposed by the spectral clustering may be distributed in a first area 712a and a second area 712b. Here, the singular vector of the second area 712b may be the singular vector generated by noise. Data corresponding to the singular vector of the second area 712b can be removed using the noise defect device according to one embodiment. In this way, as the data corresponding to the singular vector of the second area 712*b* is removed from the first WBM dataset, as shown in a third image 713, it can be confirmed that data corresponding to the noise in the first image 711 has been removed.

Figure 7B:
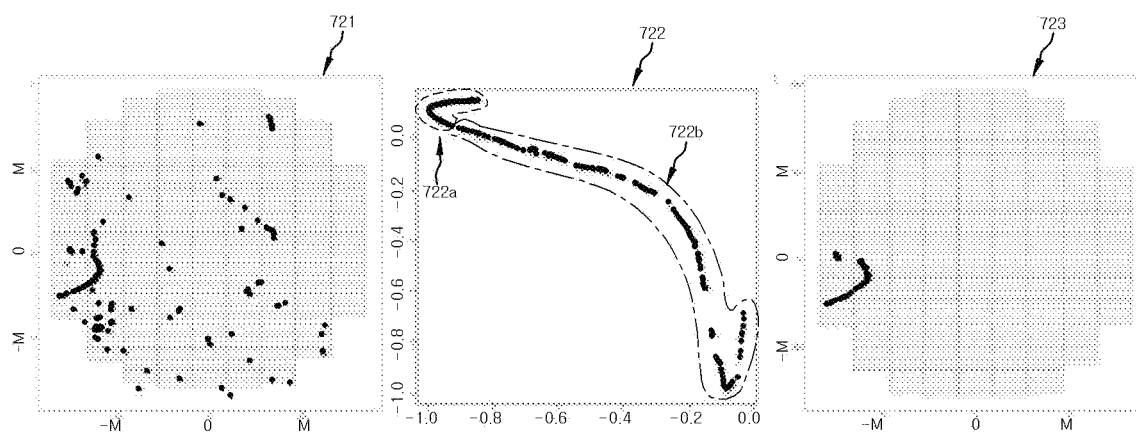
Figure 7C:
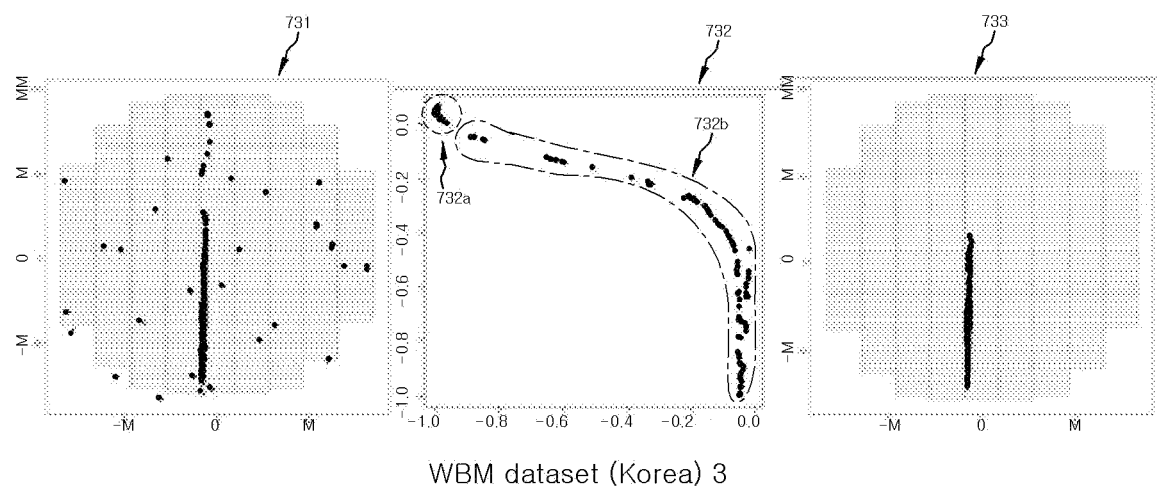
Figure 7D:
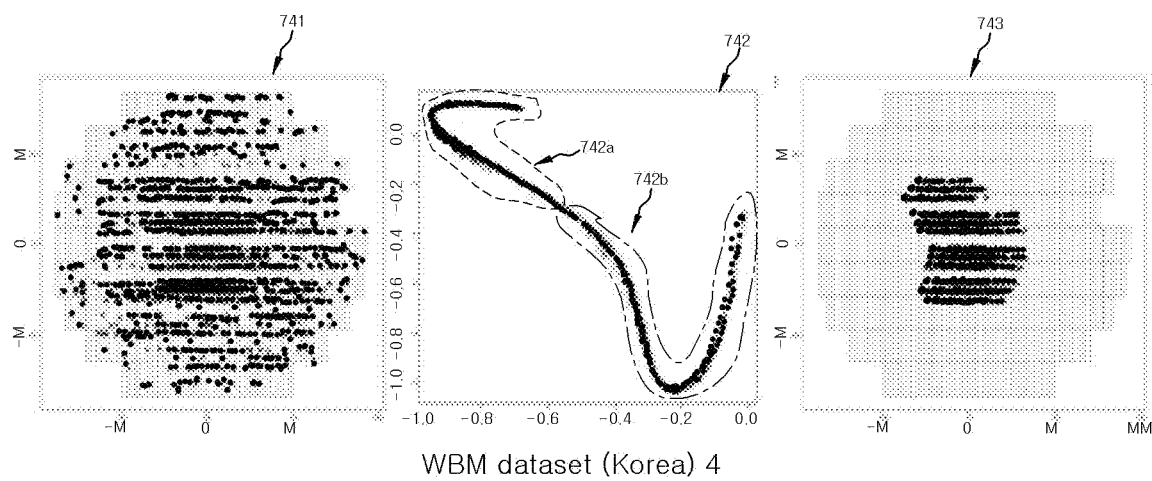
Figure 8A:
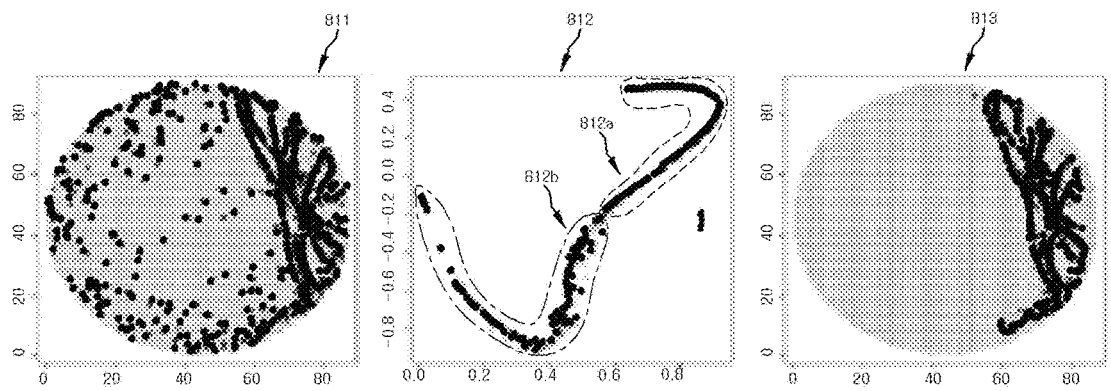
FIGS. 8A to 8H illustrate experimental examples of removing the noise defect from data of WM-811k datasets using the noise defect device according to one embodiment.
Figure 8B:
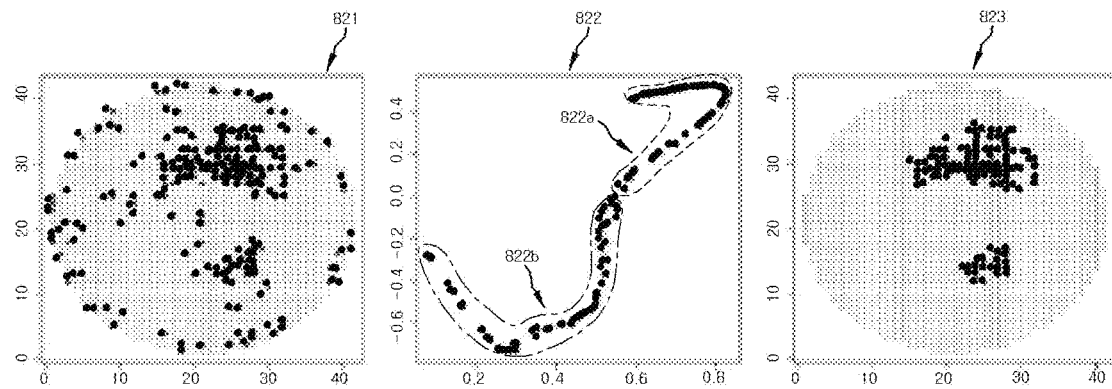
Figure 8C:
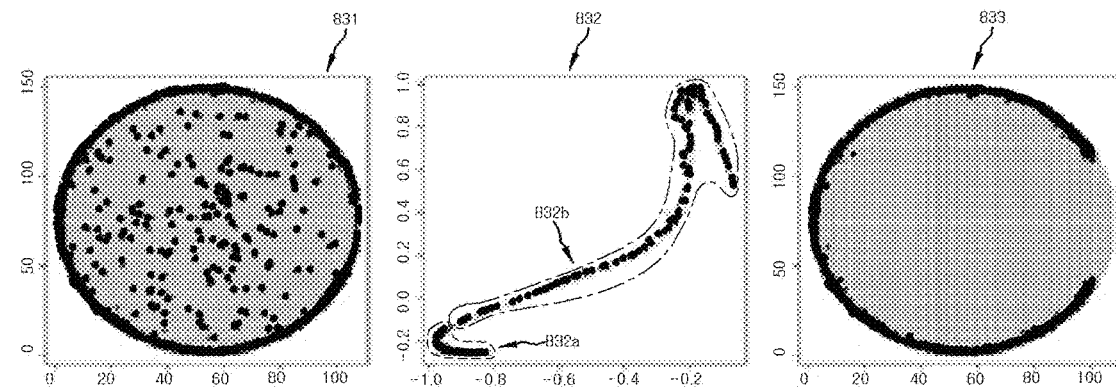
Figure 8D:
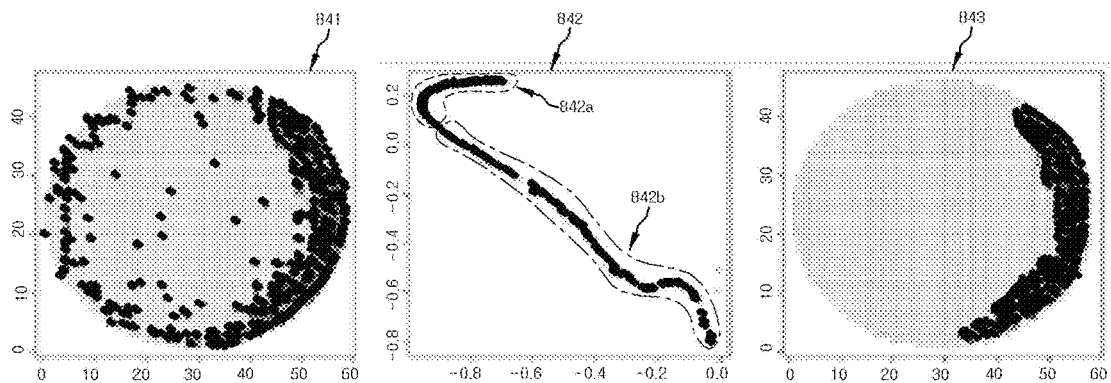
Figure 8E:
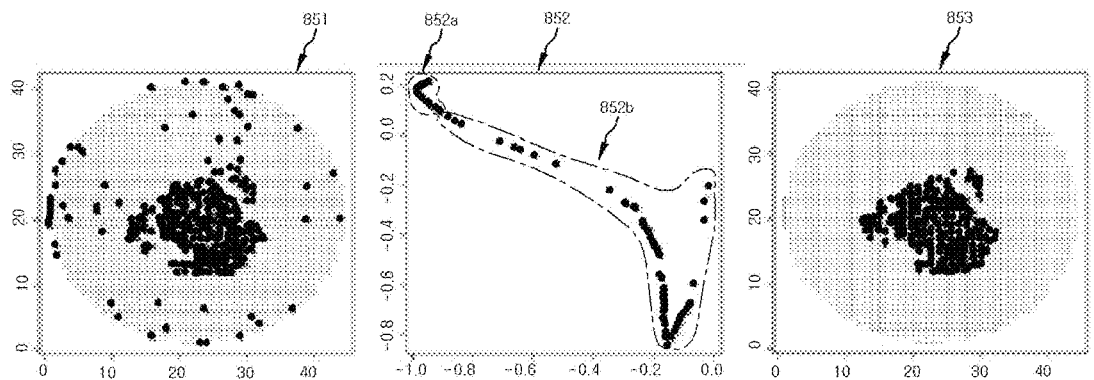
Figure 8F:
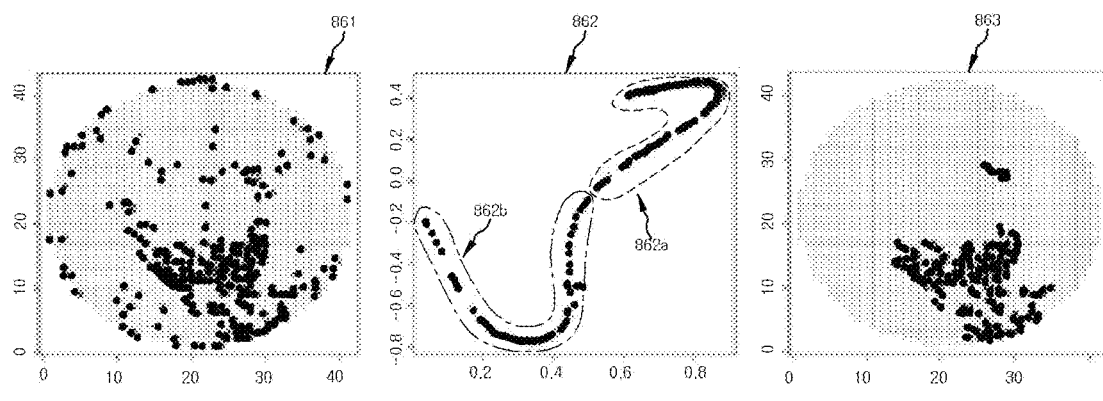
Figure 8G:
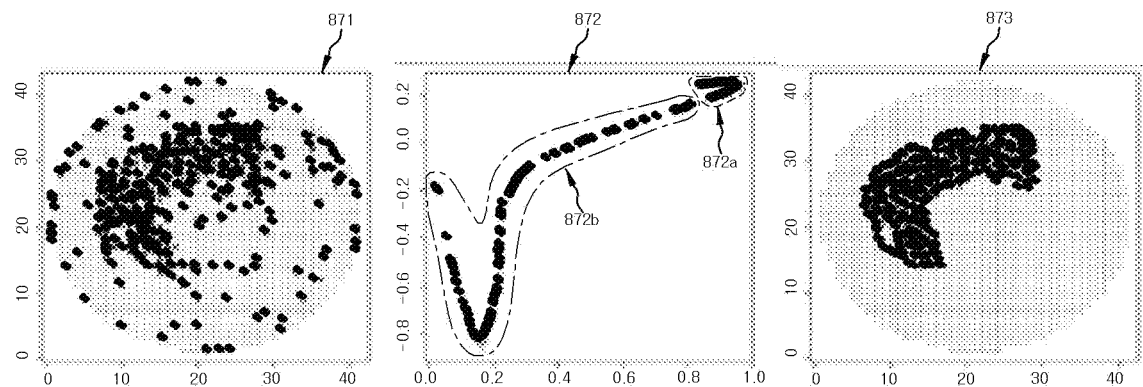
Figure 8H:
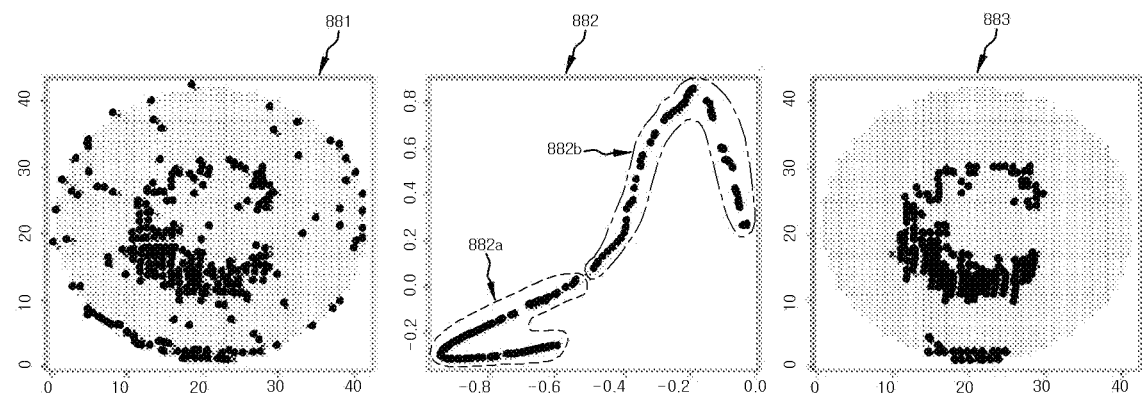

Likewise, referring to FIGS. 7B to 7D, first images 721, 731, and 741 of FIGS. 7B to 7D represent the data distribution of the second WBM dataset, second images 722, 732, and 742 represent singular vectors in which the second WBM dataset is decomposed by the the spectral clustering, and third images 723, 733, and 743 represent the data distribution after abnormal values are removed from the first WBM dataset.

Referring to FIGS. 8A to 8H, first images 811, 821, 831, 841, 851, 861, 871, and 881 of FIGS. 8A to 8H represent a first WM-811k dataset to an eighth WM-811K dataset, respectively, and second images 812, 822, 832, 842, 852, 862, 872, and 882 represent the singular vectors in which the first WM-811k dataset to the eighth WM-811K dataset are decomposed by the spectral clustering. In the second images 812, 822, 832, 842, 852, 862, 872, and 882, the singular vectors decomposed by the spectral clustering may be distributed in first areas 812*a*, 822*a*, 832*a*, 842*a*, 852*a*, 862*a*, 872*a*, and 882*a* and second areas 812*b*, 822*b*, 832*b*, 842*b*, 852*b*, 862*b*, 872*b*, and 882*b*. Here, the singular vectors of the second areas 812*b*, 822*b*, 832*b*, 842*b*, 852*b*, 862*b*, 872*b*, and 882*b* may be singular vectors generated by the noise. Additionally, third images 813, 823, 833, 843, 853, 863, 873, 883 represent the data distribution after the abnormal values are removed from the first WM-811k dataset to the eighth WM-811K dataset.

As can be seen in FIGS. 8A to 8H, clusters displayed in the second areas 812*b*, 822*b*, 832*b*, 842*b*, 852*b*, 862*b*, 872*b*, and 882*b* are determined to be noise information, and as a result, it can be confirmed that the normal defects that form the pattern within the semiconductor wafer remain, while the noise defects that are scattered sparsely and cannot be identified as a pattern have been properly removed.

Figure 9:
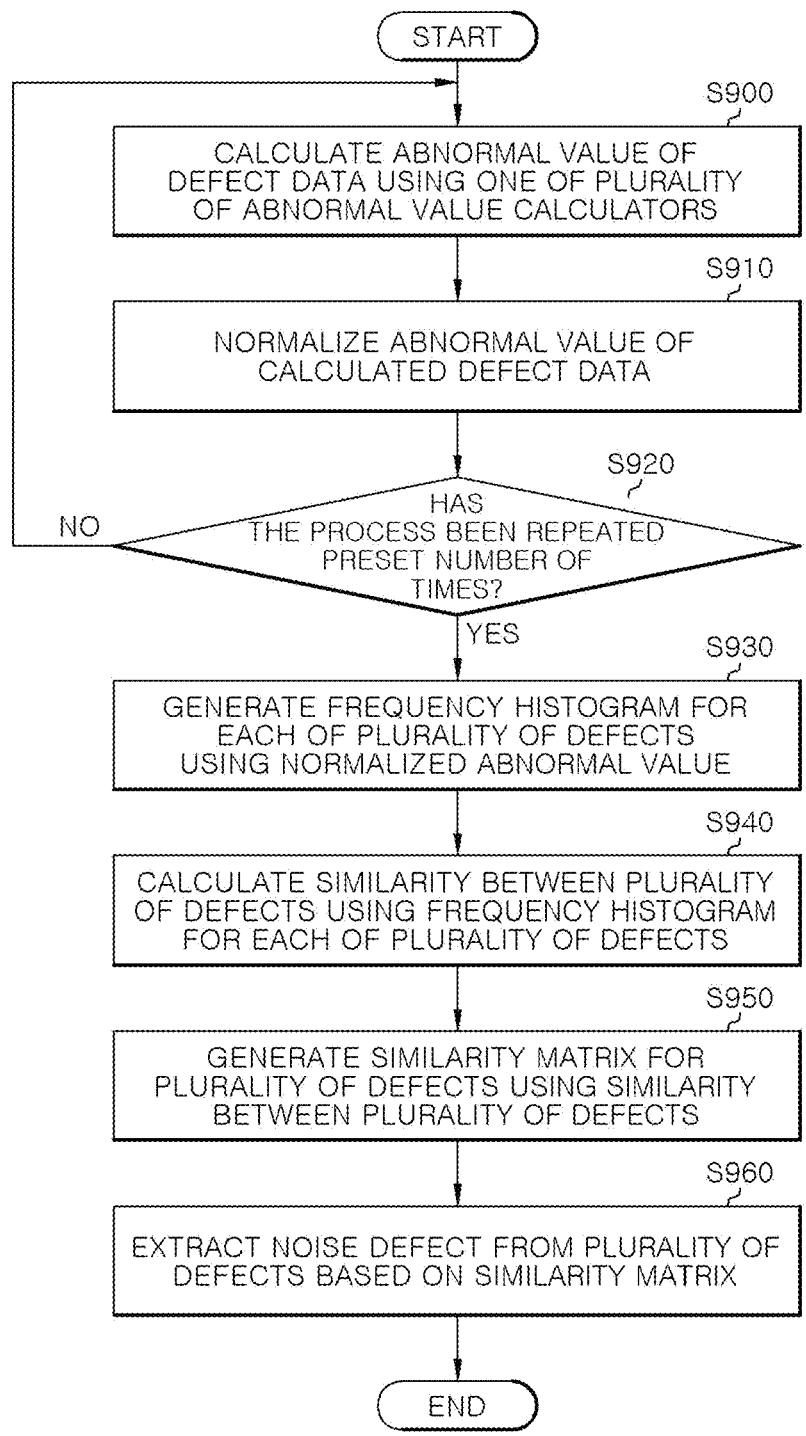
FIG. 9 is a flowchart illustrating a method by which a noise defect extraction device extracts a noise defect from defect data according to one embodiment.

FIG. 9 is a flowchart illustrating a method by which the noise defect extraction device extracts the noise defect from defect data according to one embodiment.

Referring to FIGS. 1, 2, and 9, the abnormal value calculation unit 210 may calculate the abnormal value of the defect data using one of a plurality of abnormal value calculators (S900), and normalize the abnormal value of the calculated defect data (S910).

The abnormal value calculation unit 210 may calculate the abnormal value of the defect data and repeat the process of normalizing the calculated abnormal value by a preset number of times (S920).

Meanwhile, in the present specification, for convenience of explanation, after the abnormal value calculation unit 210 normalizes the abnormal value of the defect data (S910), it is determined whether or not the process is repeated the preset number of times (S920). However, the present disclosure is not limited to this. That is, depending on an embodiment, the abnormal value calculation unit 210 may normalize the abnormal value after determining whether the process has been repeated the preset number of times, and may normalize the abnormal values calculated so far at once after repeating the process by the preset number of times.

Thereafter, the abnormal value calculation unit 210 may generate the frequency histogram for each of the plurality of defects using at least one normalized abnormal value obtained (S930).

The similarity calculation unit 220 may calculate the similarity between the plurality of defects using the frequency histogram for each of the plurality of defects (S940), and generate the similarity matrix for the plurality of defects using the similarity between the plurality of defects (S950).

The noise defect extraction unit 230 may extract the noise defect from a plurality of defects based on the similarity matrix (S960).

According to one embodiment of the present disclosure, by randomly selecting one of the plurality of abnormal value calculators and setting the parameter of the selected abnormal value calculator to the random value, the noise defect can be extracted without elaborately setting the parameter.

According to one embodiment of the present disclosure, by extracting the noise defect without elaborately setting the parameter, even a non-expert of data mining can easily use the method of the present disclosure at a semiconductor manufacturing site.

According to one embodiment of the present disclosure, the noise defect removal device can be used not only for the purpose of removing the noise defect in the semiconductor wafer, but also for the purpose of removing the abnormal value present in a dataset when analyzing general numerical data.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for identifying defects in a semiconductor wafer, the method comprising:
obtaining defect data of a wafer bin map (WBM) of the semiconductor wafer including data on a plurality of electrical defects within the semiconductor wafer;
determining one of a plurality of abnormal value calculators for calculating abnormal values using each of a variety of predetermined calculation methods and calculating an abnormal value for each of the plurality of defects using one of the plurality of abnormal value calculators;
generating a frequency histogram of a frequency of each of the plurality of defects using the abnormal values;
calculating similarity between the plurality of defects using the frequency histogram for each of the plurality of defects;
extracting a noise defect from the plurality of defects based on the similarity; and
removing the noise defect from the defect data of the WBM,
wherein the abnormal values include a value representing a degree of defect within the semiconductor wafer.

2. The method of claim 1, wherein the determining the one of the plurality of abnormal value calculators includes randomly selecting one of the plurality of abnormal value calculators.

3. The method of claim 2, wherein the extracting of the abnormal value for each of the plurality of defects further includes setting a parameter of the selected abnormal value calculator to a random value.

4. The method of claim 3, wherein the plurality of abnormal value calculators include at least two selected from the group consisting of Aggregated k Nearest Neighbors (AggkNN), Centrality and Center-Proximity-based Outlier Detection (CCPOD), Connectivity-based Outlier Factor (COF), Density Similarity Neighbor-based Outlier Factor (DSNOF), Forward Neighbor Outlier Factor (FNOF), INFLuenced Outlierness (INFLO), INStability factor (INS), k Nearest Neighbors (kNN), Local Distribution-Based Outlier Detector (LDBOD), Local Density Factor (LDF), Local Distance-based Outlier Factor (LDOF), Local Isolation Coefficient (LIC), Local Outlier Factor (LOF), Local Outlier Probability (LoOP), Nearest-neighbor Distance-based Outlier detection Technique (NDoT), Observability Factor (OF), Ordered distance difference Outlier Factor (OOF), Prototype-based Outlier Detection (POD), Rank-Based Detection Algorithm (RBDA), Synchronization-based Outlier Detection (SOD), Variance Of Volume (VOV), Gaussian Mixture Model Outlier Factor (GMMOF), Natural Outlier Factor (NOF), Relative Density-based Outlier Score (RDOS), Virtual Outlier Score (VOS), and COPula-based Outlier Detection (COPOD).

5. The method of claim 1, wherein the extracting of the abnormal value for each of the plurality of defects includes selecting one of the plurality of abnormal value calculators randomly, calculating the abnormal value for each of the plurality of defects using the selected abnormal value calculator, and repeating the selecting one of the plurality of abnormal value calculators randomly and the calculating the abnormal value for each of the plurality of defects using the selected abnormal value calculator by a preset number of times, and wherein the generating of the frequency histogram includes generating the frequency histogram for each of the plurality of defects using the abnormal values for each of the plurality of defects calculated by the repeating the selecting one of the plurality of abnormal value calculators randomly and the calculating the abnormal value for each of the plurality of defects using the selected abnormal value calculator by the preset number of times.

6. The method of claim 1, wherein the extracting of the abnormal value for each of the plurality of defects includes normalizing the abnormal value of each of the plurality of defects, and
wherein the generating of the frequency histogram for each of the plurality of defects includes generating the frequency histogram for each of the plurality of defects using the normalized abnormal value.

7. The method of claim 1, wherein the calculating of the similarity between the plurality of defects includes selecting two defects from the plurality of defects, and calculating a difference between the frequency histograms of the selected two defects.

8. The method of claim 7, wherein the calculating of the difference between the frequency histograms of the two defects includes calculating a difference in frequency for each class of the two defects using the frequency histograms of the two defects, and calculating a frequency histogram difference between the two defects by adding, for each class, an absolute value of the difference in frequency for each class.

9. The method of claim 7, wherein the selecting of two defects from the plurality of defects and the calculating of the difference between the frequency histograms of the two defects are repeatedly performed as many times as the number of cases in which two different defects are selected from the plurality of defects.

10. The method of claim 1, further comprising generating a similarity matrix for the defect data using the similarity between the plurality of defects,
wherein the extracting of the noise defect includes extracting the noise defect from the plurality of defects based on the similarity matrix.

11. The method of claim 1, wherein the extracting of the noise defect includes clustering the plurality of defects into a first cluster and a second cluster using spectral clustering, and extracting defects included in a smaller cluster of the first cluster and the second cluster as the noise defect.

12. An apparatus for identifying defects in a semiconductor wafer, the apparatus comprising:
a memory configured to store one or more instructions and a plurality of abnormal value calculators for calculating abnormal values using each of a variety of predetermined calculation methods; and
a processor configured to execute the one or more instructions stored in the memory, wherein the instructions, when executed by the processor, cause the processor to:
obtain defect data of a wafer bin map (WBM) of the semiconductor wafer including data on a plurality of electrical defects within the semiconductor wafer,
determine one of a plurality of abnormal value calculators and calculate an abnormal value for each of the plurality of defects using one of the plurality of abnormal value calculators,
generate a frequency histogram of a frequency of each of the plurality of defects using the abnormal value, calculate similarity between the plurality of defects using the frequency histogram for each of the plurality of defects, extract a noise defect from the plurality of defects based on the similarity, and remove the noise defect from the defect data of the WBM, wherein the abnormal values include a value representing a degree of defect within the semiconductor wafer.

13. The apparatus of claim 12, wherein the processor is configured to randomly select one of the plurality of abnormal value calculators.

14. The apparatus of claim 13, wherein the processor is configured to set a parameter of the selected abnormal value calculator to a random value.

15. The apparatus of claim 12, wherein the processor is configured to:

calculate the abnormal value for each of the plurality of defects by repeating an operation of randomly selecting one of the plurality of abnormal value calculators and an operation of calculating the abnormal value for each of the plurality of defects using the selected abnormal value calculator, and generate the frequency histogram for each of the plurality of defects using the abnormal values for each of the plurality of calculated defects.

16. The apparatus of claim 12, wherein the processor is configured to normalize the abnormal value of each of the plurality of defects and generate the frequency histogram for each of the plurality of defects using the normalized abnormal value.

17. The apparatus of claim 12, wherein the processor is configured to select two defects from the plurality of defects, and calculate a difference between the frequency histograms of the two defects.

18. The apparatus of claim 17, wherein the processor is configured to calculate a difference in frequency for each class of the two defects using the frequency histograms of the two defects, and calculate a frequency histogram difference between the two defects by adding, for each class, an absolute value of the difference in frequency for each class.

19. The apparatus of claim 12, wherein the processor is configured to generate a similarity matrix for the defect data using the similarity between the plurality of defects, and extract the noise defect from the plurality of defects based on the similarity matrix.

20. A non-transitory computer readable storage medium storing computer executable instructions, wherein the instructions, when executed by a processor, cause the processor to perform a method of identifying defects in a semiconductor wafer, the method comprising:

obtaining defect data of a wafer bin map (WBM) of the semiconductor wafer including data on a plurality of electrical defects within the semiconductor wafer, determining one of a plurality of abnormal value calculators for calculating abnormal values using each of a variety of predetermined calculation methods and calculating an abnormal value for each of the plurality of defects using one of the plurality of abnormal value calculators, generating a frequency histogram of a frequency of each of the plurality of defects using the abnormal value, calculating similarity between the plurality of defects using the frequency histogram for each of the plurality of defects, extracting a noise defect from the plurality of defects based on the similarity, and removing the noise defect from the defect data of the WBM, wherein the abnormal values include a value representing a degree of defect within the semiconductor wafer.

* * * * *